United States Patent
Miyajima

(10) Patent No.: US 11,381,703 B2
(45) Date of Patent: Jul. 5, 2022

(54) LIGHT SCANNING APPARATUS AND IMAGE FORMING APPARATUS

(71) Applicant: CANON KABUSHIKI KAISHA, Tokyo (JP)

(72) Inventor: Yu Miyajima, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/140,356

(22) Filed: Jan. 4, 2021

(65) Prior Publication Data
US 2021/0218859 A1 Jul. 15, 2021

(30) Foreign Application Priority Data
Jan. 15, 2020 (JP) .............................. JP2020-004152

(51) Int. Cl.
 H04N 1/028 (2006.01)
 H04N 1/04 (2006.01)
(52) U.S. Cl.
 CPC ............. H04N 1/0289 (2013.01); H04N 1/04 (2013.01)
(58) Field of Classification Search
 CPC .... G02B 26/123; G02B 27/0018; G02B 5/02; G02B 26/12; G03G 15/04045; G03G 15/04072; H04N 1/0289; H04N 1/04; H04N 1/387
 USPC ...................................................... 358/475
 See application file for complete search history.

(56) References Cited

U.S. PATENT DOCUMENTS

| | | | |
|---|---|---|---|
| 9,395,537 B2 * | 7/2016 | Ishihara | G02B 13/00 |
| 9,874,831 B2 * | 1/2018 | Sumida | G02B 26/125 |
| 10,012,938 B2 | 7/2018 | Miyajima | |
| 10,054,790 B2 | 8/2018 | Sumida et al. | |
| 10,401,770 B2 | 9/2019 | Miyajima | |
| 10,670,984 B2 | 6/2020 | Miyajima | |
| 10,754,148 B2 | 8/2020 | Teramura et al. | |
| 10,761,450 B2 | 9/2020 | Teramura et al. | |
| 10,908,544 B2 | 2/2021 | Miyajima | |

(Continued)

FOREIGN PATENT DOCUMENTS

| | | |
|---|---|---|
| JP | H11242178 A | 9/1999 |
| JP | 2002323665 A | 11/2002 |

(Continued)

*Primary Examiner* — Negussie Worku
(74) *Attorney, Agent, or Firm* — Carter, DeLuca & Farrell LLP

(57) ABSTRACT

Provided is a light scanning apparatus including a deflector deflecting a light flux to scan a scanned surface, and an imaging optical element including an optical surface and guiding light flux from deflector to scanned surface. The light scanning apparatus causes a first marginal ray on a side closer to a first deflection point on deflector in a first cross section including first deflection point and being perpendicular to a main scanning section and a sub-scanning section, the first marginal ray being included in an on-axis light flux reflected by the optical surface after being deflected at first deflection point, to travel toward a position spaced apart from first deflection point in a sub-scanning direction by 4 mm or more in first cross section. A sub-scanning width of on-axis light flux on first cross section is smaller than a sub-scanning width of on-axis light flux on optical surface.

20 Claims, 8 Drawing Sheets

(56) References Cited

U.S. PATENT DOCUMENTS

| | | | |
|---|---|---|---|
| 2011/0316960 A1* | 12/2011 | Igarashi | G03G 15/0865 |
| | | | 347/224 |
| 2014/0307037 A1* | 10/2014 | Igarashi | G03G 15/04072 |
| | | | 347/134 |
| 2016/0124219 A1* | 5/2016 | Kurokawa | B41J 2/00 |
| | | | 399/51 |
| 2016/0202393 A1 | 7/2016 | Saiga et al. | |
| 2016/0291500 A1* | 10/2016 | Taki | G02B 27/0025 |
| 2017/0031266 A1* | 2/2017 | Igarashi | H04N 1/02481 |
| 2017/0134603 A1* | 5/2017 | Kurokawa | H04N 1/02835 |
| 2017/0293236 A1* | 10/2017 | Kimura | G02B 26/125 |
| 2021/0218859 A1* | 7/2021 | Miyajima | H04N 1/04 |

FOREIGN PATENT DOCUMENTS

| | | |
|---|---|---|
| JP | 2004070109 A | 3/2004 |
| JP | 2018124325 A | 8/2018 |

\* cited by examiner

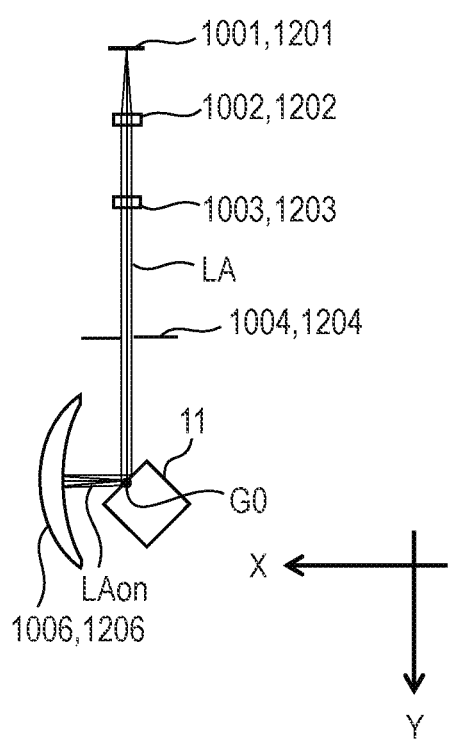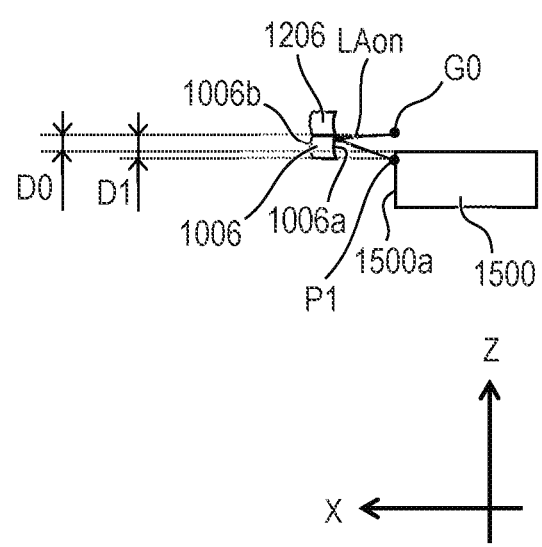
FIG. 3A
FIG. 3B

FIG. 4A
FIG. 4B
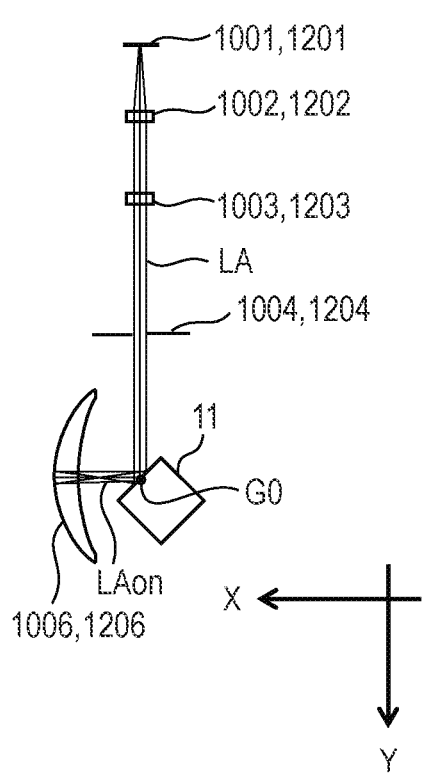
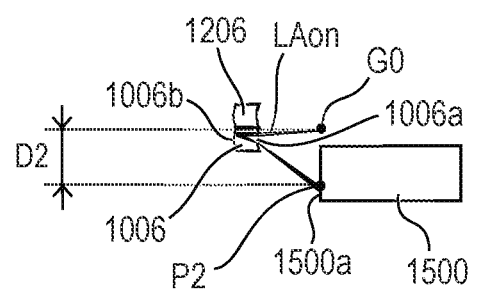

LIGHT SCANNING APPARATUS AND IMAGE FORMING APPARATUS

BACKGROUND OF THE INVENTION

Field of the Invention

The present invention relates to a light scanning apparatus, and is more particularly preferred for an image forming apparatus, for example, a laser beam printer (LBP), a digital copying machine, or a multifunction printer (MIT).

Description of the Related Art

Hitherto, it has been known that deterioration of printing performance is caused when unnecessary light generated by reflecting a part of a light flux entering an optical surface of an imaging lens in a light scanning apparatus reaches a scanned surface.

In Japanese Patent Application Laid-Open No. 2002-323665, there is disclosed a light scanning apparatus capable of reducing unnecessary light that reaches a scanned surface by forming an incident surface of an imaging lens closest to a deflector into a straight line shape or a curved line shape that is convex toward the deflector side in a sub-scanning section.

In the light scanning apparatus disclosed in Japanese Patent Application Laid-Open No. 2002-323665, the lens surface is provided so as to cause reflected light to become divergent light, and hence there is still a possibility in that a part of the reflected light becomes unnecessary light to reach the scanned surface.

SUMMARY OF THE INVENTION

Accordingly, an object of the present invention is to provide a light scanning apparatus capable of reducing unnecessary light reaching a scanned surface.

According, to the present invention, there is provided a light scanning apparatus including a deflector configured to deflect a light flux to scan a scanned surface, and an imaging optical element including an optical surface and configured to guide the light flux from the deflector to the scanned surface, in which a first cross section is a section including a first deflection point on the deflector and being perpendicular to a main scanning section and a sub-scanning section, and a first marginal ray is a ray on a side closer to the first deflection point in the first cross section. The first marginal ray is included in an on-axis light flux reflected by the optical surface after being deflected at the first deflection point. The light scanning apparatus is configured to cause the first marginal ray to travel toward a position spaced apart from the first deflection point in a sub-scanning direction by 4 mm or more in the first cross section. A width of the on-axis light flux on the first cross section in the sub-scanning direction is smaller than a width of the on-axis light flux on the optical surface in the sub-scanning direction.

Further features of the present invention will become apparent from the following description of exemplary embodiments with reference to the attached drawings.

BRIEF DESCRIPTION OF THE DRAWINGS

FIG. 3A is a partial main scanning sectional view of the light scanning apparatus according to this embodiment.

FIG. 3B is a partial sub-scanning sectional view of the light scanning apparatus according to this embodiment.

FIG. 4A is a partial main scanning sectional view of the light scanning apparatus according to this embodiment.

FIG. 4B is a partial sub-scanning sectional view of the light scanning apparatus according to this embodiment.

DESCRIPTION OF THE EMBODIMENTS

A light scanning apparatus according to an embodiment is described in detail below with reference to the accompanying drawings. Some of the drawings referred to below may be drawn in scales different from the actual scale for easier understanding of this embodiment.

In the following description, a main scanning direction refers to a direction in which a light flux is deflected and scanned by a deflector. A sub-scanning direction refers to a direction parallel to a rotational axis of the deflector. A main scanning section refers to a cross section perpendicular to the sub-scanning direction, A sub-scanning section refers to a cross section perpendicular to the main scanning direction.

Figure 1A:
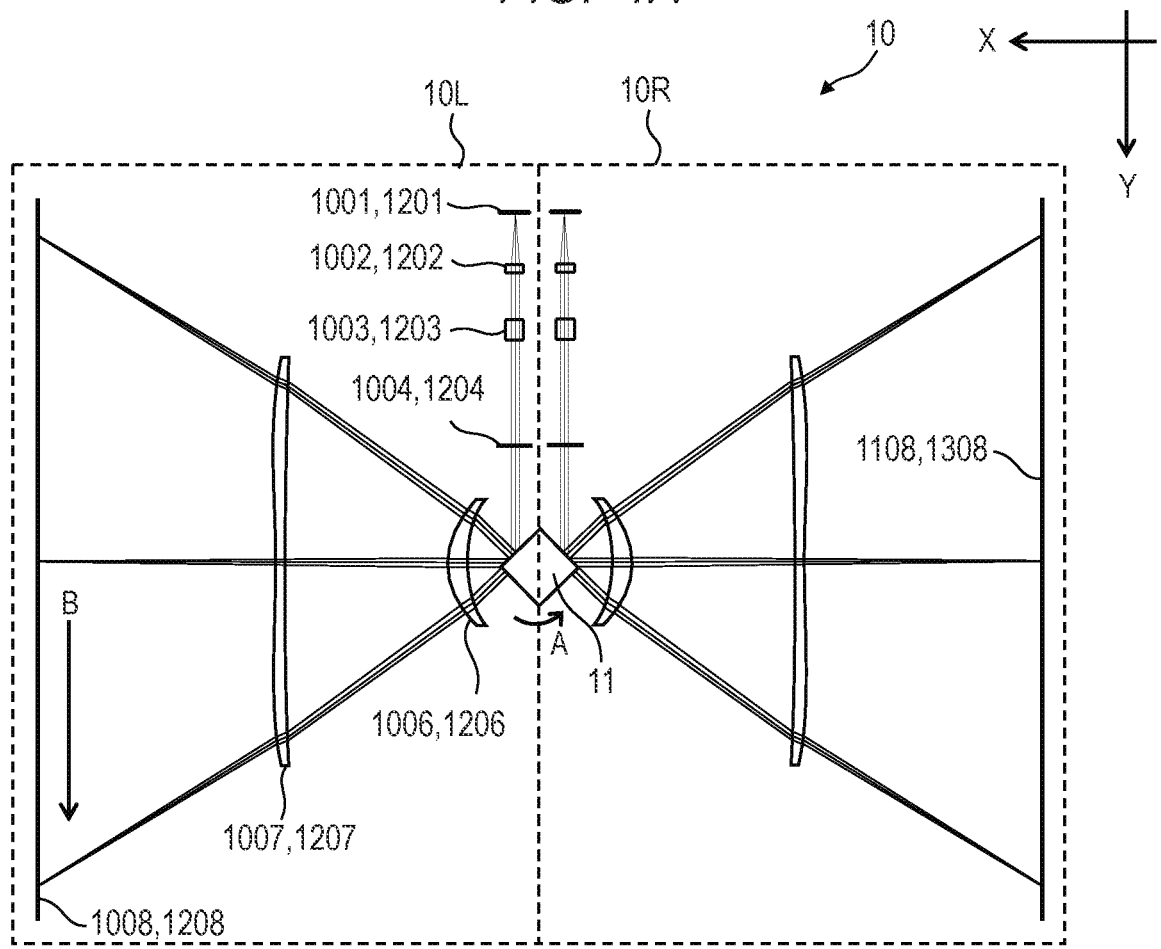
FIG. 1A is a developed view of a light scanning apparatus according to an embodiment in its main scanning section.
Figure 1B:
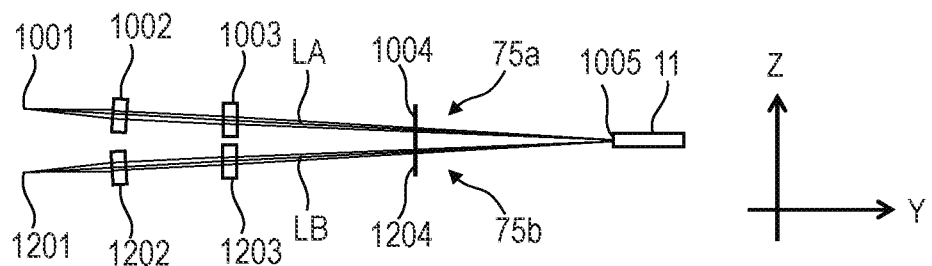
FIG. 1B is a developed view of the light scanning apparatus according to this embodiment in its sub-scanning section.
Figure 1C:
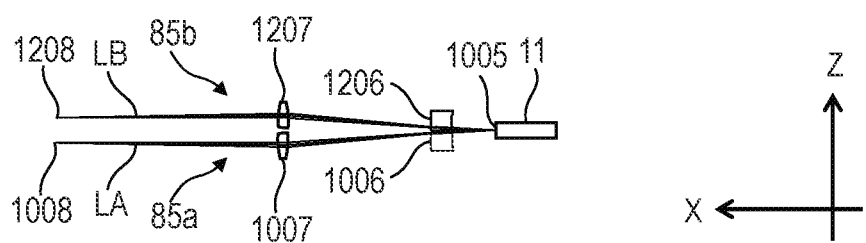
FIG. 1C is a developed view of the light scanning apparatus according to this embodiment in its sub-scanning section.

FIG. 1A is a developed view of a light scanning apparatus 10 according to this embodiment in its main scanning section. FIG. 1B and FIG. 1C are each a developed view of incident optical systems and scanning optical systems, which are included in the light scanning apparatus 10 according to this embodiment, in the sub-scanning section of the light scanning apparatus 10.

Figure 2:
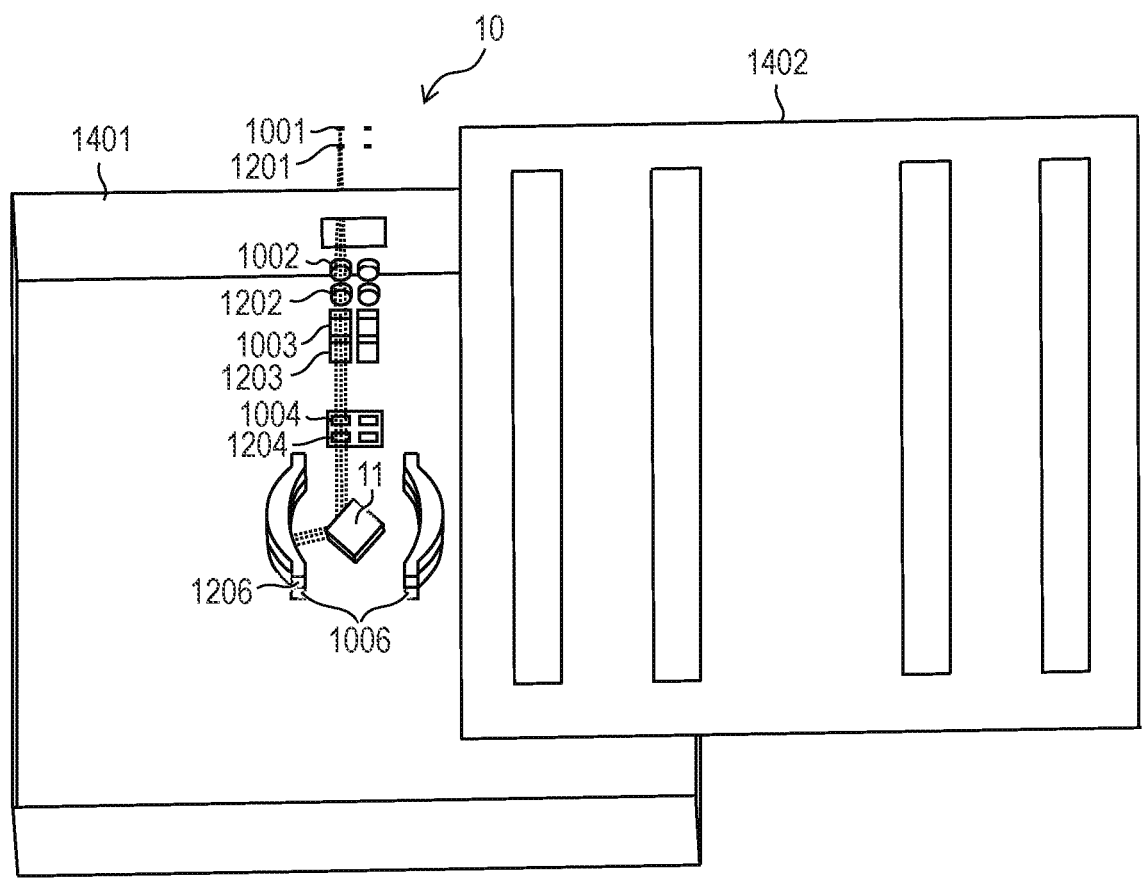
FIG. 2 is a partial schematic perspective view of the light scanning apparatus according to this embodiment.

FIG. 2 is a partial schematic perspective view of the light scanning apparatus 10 according to this embodiment.

In this case, the light scanning apparatus 10 includes a left-side scanning system 10L and a right-side scanning system 10R, which have the same configuration as each other, and are arranged symmetrically with respect to each other with a deflector 11 interposed therebetween.

The left-side scanning system 10L and the right-side scanning system 10R are configured to scan first and second scanned surfaces 1008 and 1208 and third and fourth scanned surfaces 1108 and 1308, respectively, in an opposed manner.

Thus, the following configuration can be equally applied to both the left-side scanning system 10L and the right-side scanning system 10R, and hence only the left-side scanning system 10L is described below for the sake of simplification of description.

The light scanning apparatus 10 according to this embodiment includes first and second light sources 1001 and 1201 and first and second collimator lenses 1002 and 1202.

The light scanning apparatus 10 according to this embodiment also includes first and second cylindrical lenses 1003 and 1203 and first and second aperture stops 1004 and 1204.

The light scanning apparatus 10 according to this embodiment also includes the deflector 11 and first fθ lenses 1006 and 1206 (imaging optical elements).

The light scanning apparatus 10 according to this embodiment also includes second fθ lenses 1007 and 1207.

The light scanning apparatus 10 according to this embodiment also includes: a housing 1401 (holding member) configured to hold the deflector 11 and other optical elements: and a cover member 1402.

As each of the first and second light sources 1001 and 1201, a semiconductor laser, for example, is used. Polarized light of light fluxes LA and LB (first and second light fluxes) emitted from the first and second light sources 1001 and 1201 is linearly polarized light substantially parallel to the main scanning section. That is, the light fluxes LA and LB entering the deflector 11 from the first and second light sources 1001 and 1201 at a time of reflection on a deflecting surface of the deflector 11 have more p-polarized light components than s-polarized light components.

The first and second collimator lenses 1002 and 1202 are configured to convert the light fluxes LA and LB emitted from the first and second light sources 1001 and 1201, respectively, into parallel light fluxes. It is assumed herein that the parallel light flux includes not only a strict parallel light flux but also substantially parallel light fluxes including a weak divergent light flux and a weak convergent light flux.

The first and second cylindrical lenses 1003 and 1203 each have a finite power (refractive power) in the sub-scanning section, and the light fluxes LA and LB that have passed through the first and second collimator lenses 1002 and 1202 are each condensed in the sub-scanning direction.

The first and second aperture stops 1004 and 1204 are configured to limit light flux diameters of the light fluxes LA and LB that have passed through the first and second cylindrical lenses 1003 and 1203, respectively.

In this manner, the light fluxes LA and LB emitted from the first and second light sources 1001 and 1201 are each condensed only in the sub-scanning direction in a vicinity of the deflector 11 to be imaged as a long line image in the main scanning direction.

The deflector 11 deflects the light fluxes LA and LB entering the deflector 11 by being rotated in a direction indicated by the arrow A in FIG. 1A by a motor (not shown) or another driving unit. The deflector 11 is formed of, for example, a polygon mirror.

The first fθ lens 1006 and the second fθ lens 1007 are each an anamorphic imaging lens having different powers in the main scanning section and in the sub-scanning section. The first ID lens 1006 and the second 11) lens 1007 are configured to condense (guide) the light flux LA deflected by the deflector 11 on (to) the first scanned surface 1008.

Similarly, the first fθ lens 1206 and the second fθ lens 1207 are each an anamorphic imaging lens having different powers in the main scanning section and in the sub-scanning section. The first fθ lens 1206 and the second fθ lens 1207 are configured to condense (guide) the light flux LB deflected by the deflector 11 on (to) the second scanned surface 1208.

At this time, the deflector 11 is being rotated in the direction indicated by the arrow A in FIG. 1A, and hence the deflection-scanned light fluxes LA and LB scan the first and second scanned surfaces 1008 and 1208, respectively, in a direction indicated by the arrow B in FIG. 1A.

In the light scanning apparatus 10 according to this embodiment, a first incident optical system 75a is formed of the first collimator lens 1002, the first cylindrical lens 1003, and the first aperture stop 1004. Similarly, a second incident optical system 75b is formed of the second collimator lens 1202, the second cylindrical lens 1203, and the second aperture stop 1204.

Meanwhile, in the light scanning apparatus 10 according to this embodiment, a first scanning optical system 85a (first imaging optical system) is formed of the first fθ lens 1006 and the second fθ lens 1007. Similarly, a second scanning optical system 85b is formed of the first fθ lens 1206 and the second ID lens 1207.

In the light scanning apparatus 10 according to this embodiment, optical axes of the first and second incident optical systems 75a and 75h form angles of −3.0° and +3.0°, respectively, with respect to the main scanning section when viewed in the sub-scanning section.

In this embodiment, as the first and second scanned surfaces 1008 and 1208, first and second photosensitive drums 1008 and 1208 are used.

Further, a light exposure distribution in the sub-scanning direction on the first and second photosensitive drums 1008 and 1208 is created by rotating the first and second photosensitive drums 1008 and 1208 in the sub-scanning direction for each main scanning light exposure.

A mirror member (not show) configured to fold an optical path is provided between the deflector 11 and the fθ lenses included in the first and second scanning optical systems 85a and 85b.

In order to simplify discussion, the following description is given through use of only developed optical paths, and description of the mirror member is omitted.

Next, various characteristics of the first incident optical system 75a and the first scanning optical system 85a of the light scanning apparatus 10 according to this embodiment are shown in Table 1 and Table 2.

It is only required to change signs of Z coordinates and elevation angles of the first incident optical system 75a and the first scanning optical system 85a in order to obtain those of the second incident optical system 75b and the second scanning optical system 85b, respectively. Thus, description of the second incident optical system 75b and the second scanning optical system 85b is omitted in Table 1 and Table 2 and the following description thereof.

TABLE 1

| Various characteristics of light sources 1001 and 1201 | | | Layout | | |
|---|---|---|---|---|---|
| Wavelength | λ(nm) | 790 | From light sources 1001 and 1201 to collimator lenses 1002 and 1202 | d0 (mm) | 18.31 |

TABLE 1-continued

| Various characteristics of light sources 1001 and 1201 | | | | Layout | | |
|---|---|---|---|---|---|---|
| Polarized light entering deflecting surface of deflector 11 | | p-polarized light | | From incident surfaces of collimator lenses 1002 and 1202 to exit surfaces of collimator lenses 1002 and 1202 | d1 (mm) | 3.00 |
| Stop shape | | | | | | |
| | | Main scanning direction | Sub-scanning direction | From exit surfaces of collimator lenses 1002 and 1202 to incident surfaces of cylindrical lenses 1003 and 1203 | d2 (mm) | 16.00 |
| Aperture stops 1004 and 1204 | | 3.050 | 0.782 | | | |
| Refraction index | | | | From incident surfaces of cylindrical lenses 1003 and 1203 to exit surfaces of cylindrical lenses 1003 and 1203 | d3 (mm) | 7.00 |
| Collimator lenses 1002 and 1202 | N1 | 1.762 | | | | |
| Cylindrical lenses 1003 and 1203 | N2 | 1.524 | | From exit surfaces of cylindrical leases 1003 and 1203 to aperture stops 1004 and 1204 | d4 (mm) | 36.61 |
| Optical element shape | | | | | | |
| | | Main scanning direction | Sub-scanning direction | From aperture stops 1004 and 1204 to deflection point G0 | d5 (mm) | 40.33 |
| Curvature radius of incident surface of each of collimator lenses 1002 and 1202 | r1a (mm) | ∞ | ∞ | Incident angle of light exiting aperture stop 1004 with respect to deflector 11 in main scanning section A1 (deg) | | 90.00 |
| Curvature radius of exit surface of each of collimator lenses 1002 and 1202 | r1b (mm) | −15.216 | −15.216 | Incident angle of light exiling aperture stop 1204 with respect to deflector 11 in main scanning section A2 (deg) | | 90.00 |
| Curvature radius of incident surface of each of cylindrical lenses 1003 and 1203 | r2a (mm) | ∞ | −41.280 | Incident angle of light exiting aperture stop 1004 with respect to deflector 11 in sub-scanning section A3 (deg) | | −3.00 |
| Curvature radius of exit surface of each of cylindrical lenses 1003 and 1203 | r2b (mm) | ∞ | ∞ | Incident angle of light exiting aperture stop 1204 with respect to deflector 11 in sub-scanning section A4 (deg) | | 3.00 |

TABLE 2

| fθ coefficient scanning angle, angle of view | | |
|---|---|---|
| fθ coefficient | k(mm/rad) | 146 |
| Scanning width | W(mm) | 230 |
| Maximum angle of view | θ(deg) | 45.1 |
| Refraction index | | |
| Refraction index of first fθ lens 1006 | N5 | 1.528 |
| Refraction index of second fθ lens 1007 | N6 | 1.528 |
| Deflector | | |
| Number of deflecting surfaces | | 4 |
| Circumradius | Rpol(mm) | 10 |
| (Rotation center) − (deflection point G0) (optical axis direction) | Xpol(mm) | 5.74 |
| (Rotation center) − (deflection point G0) (main scanning direction) | Ypol(mm) | −4.26 |
| Scanning optical system, layout | | |
| From deflection point G0 to incident surface of first fθ lens 1006 | d12 (mm) | 17.00 |
| From incident surface of first fθ lens 1006 to exit surface of first fθ lens 1006 | d13 (mm) | 6.70 |
| From exit surface of first fθ lens 1006 to incident surface of second fθ lens 1007 | d14 (mm) | 72.30 |
| From incident surface of second fθ lens 1007 to exit surface of second fθ lens 1007 | d15 (mm) | 3.50 |
| From exit surface of second fθ lens 1007 to first scanned surface 1008 | d16 (nun) | 68.50 |
| From deflection point G0 to incident surface of second fθ lens 1007 | L1(mm) | 96.00 |
| From deflection point G0 to first scanned surface 1008 | T1(mm) | 168.00 |
| Sub-scanning eccentricity amount of second fθ lens 1007 | shiftZ(mm) | −6.86 |
| Sub-scanning magnification of first scanning optical system 85a | βs | 1.02 |

| Meridional line shape of first fθ lens 1006 | | Meridional line shape of second fθ lens 1007 | |
|---|---|---|---|
| Incident surface Side opposite to light source side | Exit surface Side opposite to light source side | Incident surface Side opposite to light source side | Exit surface Side opposite to light source side |
| R −51.137 | −30.538 | R −10000 | 281.813 |
| ku 3.782E+00 | −3.368E+00 | ku 0 | −5.485E+01 |
| B4u 7.252E−06 | −1.090E−05 | B4u 0 | −3.264E−07 |

TABLE 2-continued

| | | | | | |
|---|---|---|---|---|---|
| B6u | 1.546E−08 | 1.615E−08 | B6u | 0 | 4.228E−11 |
| B8u | −6.679E−11 | −2.346E−11 | B8u | 0 | −4.867E−15 |
| B10u | 8.958E−14 | −7.706E−15 | B10u | 0 | 3.418E−19 |
| B12u | 0 | 0 | B12u | 0 | −1.028E−23 |
| | Light source side | Light source side | | Light source side | Light source side |
| kl | 3.782E+00 | −3.368E+00 | kl | 0 | −5.485E+01 |
| B4l | 7.252E−06 | −1.101E−05 | B4l | 0 | −3.279E−07 |
| B6l | 1.546E−08 | 1.662E−08 | B6l | 0 | 4.348E−11 |
| B8l | −6.679E−11 | −2.468E−11 | B8l | 0 | −5.180E−15 |
| B10l | 8.958E−14 | −6.273E−15 | B10l | 0 | 3.783E−19 |
| B12l | 0 | 0 | B12l | 0 | −1.200E−23 |
| | Sagittal line shape of first fθ lens 1006 | | | Sagittal line shape of second fθ lens 1007 | |
| | Incident surface Sagittal line R change | Exit surface Sagittal line R change | | Incident surface Sagittal line R change | Exit surface Sagittal line R change |
| r | −17.000 | −14.556 | r | 23.575 | −1000.000 |
| E1 | −0.005415295 | −0.0030636 | E1 | 1.576E−04 | 0.000E+00 |
| E2 | 0.002759211 | 0.000223 | E2 | 7.982E−05 | 0.000E+00 |
| E3 | 4.63361E−05 | 1.10195E−05 | E3 | 0 | 0 |
| E4 | 2.44549E−06 | 1.436E−07 | E4 | −4.320E−09 | 0.000E+00 |
| E5 | 0 | 0 | E5 | 0 | 0 |
| E6 | 7.82039E−09 | 0.000E+00 | E6 | 2.334E−14 | 0.000E+00 |
| E7 | 0 | 0 | E7 | 0 | 0 |
| E8 | 0 | 0 | E8 | −8.605E−18 | 0.000E+00 |
| E9 | 0 | 0 | E9 | 0 | 0 |
| E10 | 0 | 0 | E10 | 0 | 0 |
| | Sagittal line tilt | Sagittal line tilt | | Sagittal line tilt | Sagittal line tilt |
| M0_1 | −0.2 | −0.2618 | M0_1 | −0.1965 | 0.0207 |
| M1_1 | 0.00022893 | 3.225E−04 | M1_1 | 0.0000000 | −0.0000305 |
| M2_1 | 0.00185711 | 3.739E−05 | M2_1 | 8.809E−06 | −1.337E−05 |
| M3_1 | −1.71779E−06 | −1.738E−06 | M3_1 | 0.000E+00 | 6.382E−09 |
| M4_1 | −5.9373E−08 | 9.150E−08 | M4_1 | −2.512E−09 | 9.477E−10 |
| M5_1 | 0 | 0 | M5_1 | 0.000E+00 | −5.054E−14 |
| M6_1 | 0 | 0 | M6_1 | 2.908E−14 | −3.828E−13 |
| M7_1 | 0 | 0 | M7_1 | 0.000E+00 | −1.696E−16 |
| M8_1 | 0 | 0 | M8_1 | 1.548E−16 | 1.056E−16 |
| M9_1 | 0 | 0 | M9_1 | 0.000E+00 | 1.463E−20 |
| M10_1 | 0 | 0 | M10_1 | −3.590E−21 | 6.188E−21 |
| M11_1 | 0 | 0 | M11_1 | 0 | 0 |
| M12_1 | 0 | 0 | M12_1 | 0 | 0 |

In Table 1 and Table 2, it is assumed that an intersection G0 (hereinafter referred to as "deflection point G0") between an on-axis light flux LAon and the deflector 11 is an origin, the main scanning direction is a Y-axis, the sub-scanning direction is a Z-axis, and a direction perpendicular to the Y-axis and the Z-axis is an X-axis.

In Table 2, "E-x" means "×10$^{-x}$".

An aspherical shape (meridional line shape) of a lens surface of each of the first fθ lens 1006 and the second fθ lens 1007 of the light scanning apparatus 10 according to this embodiment in the main scanning section is expressed by Expression (1).

$$x = \frac{y^2/R}{1 + (1 - (1+k)(y/R)^2)^{1/2}} + \sum_{i=4}^{12} B_i y^i \quad (1)$$

In Expression (1), R represents a curvature radius, k represents an eccentricity, and Bi (i=4, 6, 8, 10, 12) represents an aspherical coefficient. When the coefficient Bi differs between a plus side and a minus side in terms of y, as shown in Table 2, a suffix u is added to the coefficient on the plus side (namely, Biu), and a suffix l is added to the coefficient on the minus side (namely, Bil).

An aspherical shape (sagittal line shape) of a lens surface of each of the first fθ lens 1006 and the second fθ lens 1007 in the sub-scanning section is expressed by Expression (2).

$$S = \frac{z^2/r'}{1 + (1 - (z/r')^2)^{1/2}} + \sum_{j=0}^{12} \sum_{k=1}^{1} M_{jk} Y^j Z^k \quad (2)$$

In Expression (2), $M_{jk}$ (where j=0 to 12 and k=1) represents an aspherical coefficient.

A sagittal line tilt amount in this embodiment refers to $M_{01}$. Thus, a sagittal line tilt surface refers to a surface having $M_{01}$ that is not 0, and a sagittal line tilt change surface refers to a surface having at least one of $M_{j1}$ (where j=1 to 12) that is not 0.

A curvature radius r' in the sub-scanning section continuously changes in accordance with a y-coordinate of the lens surface as expressed in Expression (3).

$$r' = r\left(1 + \sum_{j=1}^{10} E_j y^j\right) \quad (3)$$

In Expression (3), r represents a curvature radius on an optical axis, and $E_j$ (where j=1 to 10) represents a variation coefficient.

Next, features of the light scanning apparatus 10 according to this embodiment and effects to be obtained thereby are described.

As described above, in a related-art light scanning apparatus including imaging lenses provided so as to cause reflected light from an incident surface of an imaging lens closest to a deflector to become divergent light, there is still a possibility in that a part of the reflected light becomes unnecessary light to reach a scanned surface.

In a light scanning apparatus including two imaging optical systems arranged so as to be opposed to each other with a deflector interposed therebetween, there is also a problem in that deterioration of printing performance is caused when unnecessary light reflected so as to be diverged in one of the imaging optical systems enters the other imaging optical system.

Thus, in the light scanning apparatus 10 according to this embodiment, it is possible to reduce unnecessary light reaching the scanned surface by employing the following configuration.

FIG. 3A and FIG. 4A are each a partial main scanning sectional view of the light scanning apparatus 10 according to this embodiment.

FIG. 3B and FIG. 4B are each a partial sub-scanning sectional view of the light scanning apparatus 10 according to this embodiment.

In FIG. 3A and FIG. 3B, there is also illustrated an optical path exhibited when the on-axis light flux LAon that has been emitted from the first light source 1001 and has been deflected to reach an on-axis image height by the deflector 11 is reflected by an incident surface 1006a (optical surface) of the first fθ lens 1006.

In the same manner, in FIG. 4A and FIG. 4B, there is also illustrated an optical path exhibited when the on-axis light flux LAon that has been emitted from the first light source 1001 and has been deflected to reach an on-axis image height by the deflector 11 is reflected by an exit surface 1006h (optical surface) of the first fθ lens 1006.

As illustrated in FIG. 3B, the on-axis light flux LAon reflected by the incident surface 1006a, of the first fθ lens 1006 reaches a position P1 spaced apart from the deflection point G0 (first deflection point) in the sub-scanning direction by a separation amount D1 in a first cross section (YZ cross section) including the deflection point G0 and being perpendicular to the main scanning section (YY cross section) and the sub-scanning section (XZ cross section).

In this case, the separation amount D1 is evaluated by a light beam that reaches the position P1 closest to the deflection point G0 on the first cross section in the on-axis light flux LAon reflected by the incident surface 1006a of the first fθ lens 1006.

The light scanning apparatus 10 according to this embodiment also includes a light-shielding portion 1500 provided so as to block the on-axis light flux LAon reaching the position P1.

Thus, the on-axis light flux LAon reflected by the incident surface 1006a of the first fθ lens 1006 can be blocked by the light-shielding portion 1500, to thereby reduce an influence of unnecessary light from the incident surface 1006a of the first fθ lens 1006.

The light-shielding portion 1500 can be integrally molded and provided to the housing 1401 as a protruding portion, but the present invention is not limited thereto, and the light-shielding portion 1500 may be provided as a light-shielding member separate from the housing 1401.

The light-shielding portion 1500 may also be provided by forming a groove in the housing 1401.

As illustrated in FIG. 4B, the on-axis light flux LAon reflected by the exit surface 1006h of the first fθ lens 1006 reaches a position P2 spaced apart from the deflection point G0 in the sub-scanning direction by a separation amount D2 in the first cross section.

In this case, the separation amount D2 is evaluated by a light beam that reaches the position P2 closest to the deflection point G0 on the first cross section in the on-axis light flux lAon reflected by the exit surface 1006b of the first fθ lens 1006.

The light scanning apparatus 10 according to this embodiment also includes the light-shielding portion 1500 provided so as to block the on-axis light flux LAon reaching the position P2.

Thus, the on-axis light flux LAon reflected by the exit surface 1006b of the first ID lens 1006 can be blocked by the light-shielding portion 1500, to thereby reduce an influence of unnecessary light from the exit surface 1006b of the first fθ lens 1006.

In general, the deflector 11 is designed to have a thickness of about 2 mm in the sub-scanning direction and to have the deflection point G0 located at its center.

Then, in consideration of an air flow due to an operation of the deflector 11 and an assembly error, a clearance (distance from the deflection point G0 to an end portion of the light-shielding portion 1500 on the deflector 11 side in the sub-scanning direction) D0 from the center of the deflector 11 to the light-shielding portion 1500 in the sub-scanning direction is required to be at least 4 mm.

When the clearance D0 is less than 4 mm, the air flow due to the operation of the deflector 11 may be bounced off by the light-shielding portion 1500, to thereby exert an adverse influence on the operation of the deflector 11.

In addition, dirt accumulated on the light-shielding portion 1500 may adhere to the deflector 11, or may cause interference between the deflector 11 and the light-shielding portion 1500 during assembly.

For that reason, in the light scanning apparatus 10 according to this embodiment, the light-shielding portion 1500 is provided so as not to be included in a range of the clearance D0 from the deflection point G0 in the sub-scanning direction.

In addition, the first scanning optical system 85a is designed so that the on-axis light flux LAon reflected by the incident surface 1006a and the exit surface 1006b of the first fθ lens 1006 does not reach the range of the clearance D0 from the deflection point G0 in the sub-scanning direction in the first cross section.

Thus, it is possible to easily block unnecessary light from the incident surface 1006a and the exit surface 1006b of the first fθ lens 1006.

In view of the above, in the light scanning apparatus 10 according to this embodiment, the first scanning optical system 85a is designed so as to satisfy Expression (4a).

$$D1 \geq 4 \text{ mm} \tag{4a}$$

In other words, in the light scanning apparatus 10 according to this embodiment, a marginal ray (first marginal ray) on a side closer to the deflection point G0 on the first cross section, the marginal ray being included in the on-axis light flux LAon (reflected on-axis light flux) reflected by the incident surface 1006a of the first fθ lens 1006 after being deflected at the deflection point G0 on the deflector 11, travels toward a position on the first cross section spaced apart from the deflection point G0 in the sub-scanning direction by 4 mm or more.

In the light scanning apparatus 10 according to this embodiment, it is preferred to provide the light-shielding portion 1500 and design the first scanning optical system 85a so as to satisfy Expressions (4b) and (4c).

$$D0 \geq 4 \text{ mm} \tag{4b}$$

$$D2 \geq 4 \text{ mm} \tag{4c}$$

In this case, in the light scanning apparatus 10 according to this embodiment, Expressions (4a) to (4c) are satisfied with D0=5.00 mm, D1=7.04 mm, and D2=15.43 mm.

Further, in the light scanning apparatus 10 according to this embodiment, it is preferred to provide the light-shielding portion 1500 and design the first scanning optical system 85a so as to satisfy Expressions (5a) and (5b).

$$D1 \geq D0 \geq 4 \text{ mm} \tag{5a}$$

$$D2 \geq D0 \geq 4 \text{ mm} \tag{5b}$$

Thus, the on-axis light flux LAon reflected by the first fθ lens 1006 can be blocked by an end portion of the light-shielding portion 1500 on the first ID lens 1006 side, namely, a light-shielding surface 1500a.

Accordingly, an effect of suppressing a generation of unnecessary light is enhanced on a side opposite to the first scanning optical system 85a with respect to the deflector 11, namely, in the right-side scanning system 10R including the scanning optical systems (second imaging optical systems) configured to guide light fluxes to the third and fourth scanned surfaces 1108 and 1308.

Next, consideration is given to the light flux diameter of the on-axis light flux LAon reflected by the first fθ lens 1006 in the sub-scanning direction.

First, light flux widths (hereinafter referred to as "sub-scanning light flux widths") Wr1 and Wd1 of the on-axis light flux LAon reflected by the incident surface 1006a of the first ID lens 1006 on the incident surface 1006a and on the position P1 in the sub-scanning direction are 0.34 mm and 0.02 mm, respectively.

That is, the sub-scanning light flux width Wd1 on the position P1 is smaller than the sub-scanning light flux width Wr1 on the incident surface 1006a, and hence a size of the light-shielding portion 1500 in the sub-scanning direction can be reduced.

Meanwhile, sub-scanning light flux widths Wr2 and Wd2 of the on-axis light flux LAon reflected by the exit surface 1006b of the first fθ lens 1006 on the exit surface 1006b and on the position P2 are 0.47 mm and 1.59 mm, respectively.

That is, the sub-scanning light flux width Wd2 on the position P2 is larger than the sub-scanning light flux width Wr2 on the exit surface 1006b.

Such a configuration is disadvantageous for reducing the size of the light-shielding portion 1500, but the light scanning apparatus 10 according to this embodiment is designed so that the separation amount D2 is sufficiently large, and hence the configuration causes no problem.

When the sub-scanning light flux width Wd1 on the position P1 is equal to or smaller than ½ of the sub-scanning light flux width Wr1 on the incident surface 1006a, a sufficient affect of reducing the size of the light-shielding portion 1500 can be obtained. The light scanning apparatus 10 according to this embodiment satisfies the above-mentioned condition.

As described later, in the light scanning apparatus 10 according to this embodiment, a focusing point of the on-axis light flux LAon does not fall between the first cross section and a second cross section (YZ cross section) including a reflection point (first reflection point) of a principal ray of the on-axis light flux LAon on the incident surface 1006a and being perpendicular to the main scanning section (ICY cross section) and the sub-scanning section (XZ cross section).

That is, in the light scanning apparatus 10 according to this embodiment, the on-axis light flux LAon reflected by the incident surface 1006a is focused on a side opposite to the first fθ lens 1006 with respect to the first cross section.

However, the present invention is not limited thereto, and the focusing point of the on-axis light flux LAon may fall between the second cross section and the first cross section.

In the light scanning apparatus 10 according to this embodiment, the light-shielding portion 1500 is configured to perform light shielding by the light-shielding surface 1500a parallel to the YZ cross section.

Incident angles (angles (acute angles) formed with respect to the main scanning section) 01 and 02 of the principal ray of the on-axis light flux LAon reflected by the incident surface 1006a and the exit surface 1006b of the first fθ lens 1006 with respect to the light-shielding surface 1500a are 19.7° and 36.3°, respectively.

In this manner, the light scanning apparatus 10 according to this embodiment is preferred to be designed so that the incident angle of the principal ray of the on-axis light flux LAon reflected by the first ft) lens 1006 with respect to the light-shielding surface 1500a is equal to or smaller than 45°.

Thus, even when a surface of the housing 1401 integrally formed with the light-shielding portion 1500 is smooth, its reflectance can be reduced, to thereby be able to enhance a light-shielding effect against unnecessary light.

As described above, the light-shielding portion 1500 for blocking the on-axis light flux LAon reflected by the first fθ lens 1006 is integrally formed to the housing 1401.

Meanwhile, the light-shielding portion 1500 for blocking the light flux LB (not shown) reflected by the first fθ lens 1206 may be integrally formed to the cover member 1402.

However, the present invention is not limited thereto, and the light-shielding portion 1500 for blocking the light flux LB can be provided as a light-shielding member separate from the cover member 1402.

The light-shielding portion 1500 tier blocking the light flux LB may also be provided by forming a groove in the cover member 1402.

The light scanning apparatus 10 according to this embodiment does not include an optical member configured to refract or reflect the on-axis light flux LAon reflected by the first ID lens 1006 before the on-axis light flux LAon reaches the light-shielding portion 1500.

In other words, in the light scanning apparatus 10 according to this embodiment, an optical element is not provided on an optical path of the on-axis light flux LAon between the second cross section and a third cross section including the light-shielding surface 1500a of the light-shielding portion 1500.

With such a configuration of the light scanning apparatus 10 according to this embodiment, an optical path of unnecessary light due to reflection of the on-axis light flux LAon by the incident surface 1006a and the exit surface 1006b of the first fθ lens 1006 can be controlled only by a shape of the first fθ lens 1006. A simple light-shielding configuration can be thereby achieved.

In addition, in the light scanning apparatus 10 according to this embodiment, it is preferred that the light-shielding surface 1500a of the light-shielding portion 1500 be provided on a side opposite to the first fθ lens 1006 with respect to the deflection point G0 in the main scanning section.

When the light scanning apparatus 10 according to this embodiment is configured in this manner, space enough to facilitate the assembly can be provided between the deflection point G0 and the first fθ lens 1006.

However, the present invention is not limited thereto, and the light-shielding surface 1500a of the light-shielding portion 1500 may be provided between the deflection point G0 and the first fθ lens 1006 in the main scanning section.

With such a configuration, the assembly becomes more difficult, but enough space on the deflector 11 can be secured, which is advantageous in, for example, handling of air flow.

Next, a basic idea of this embodiment is described.

Figure 5:
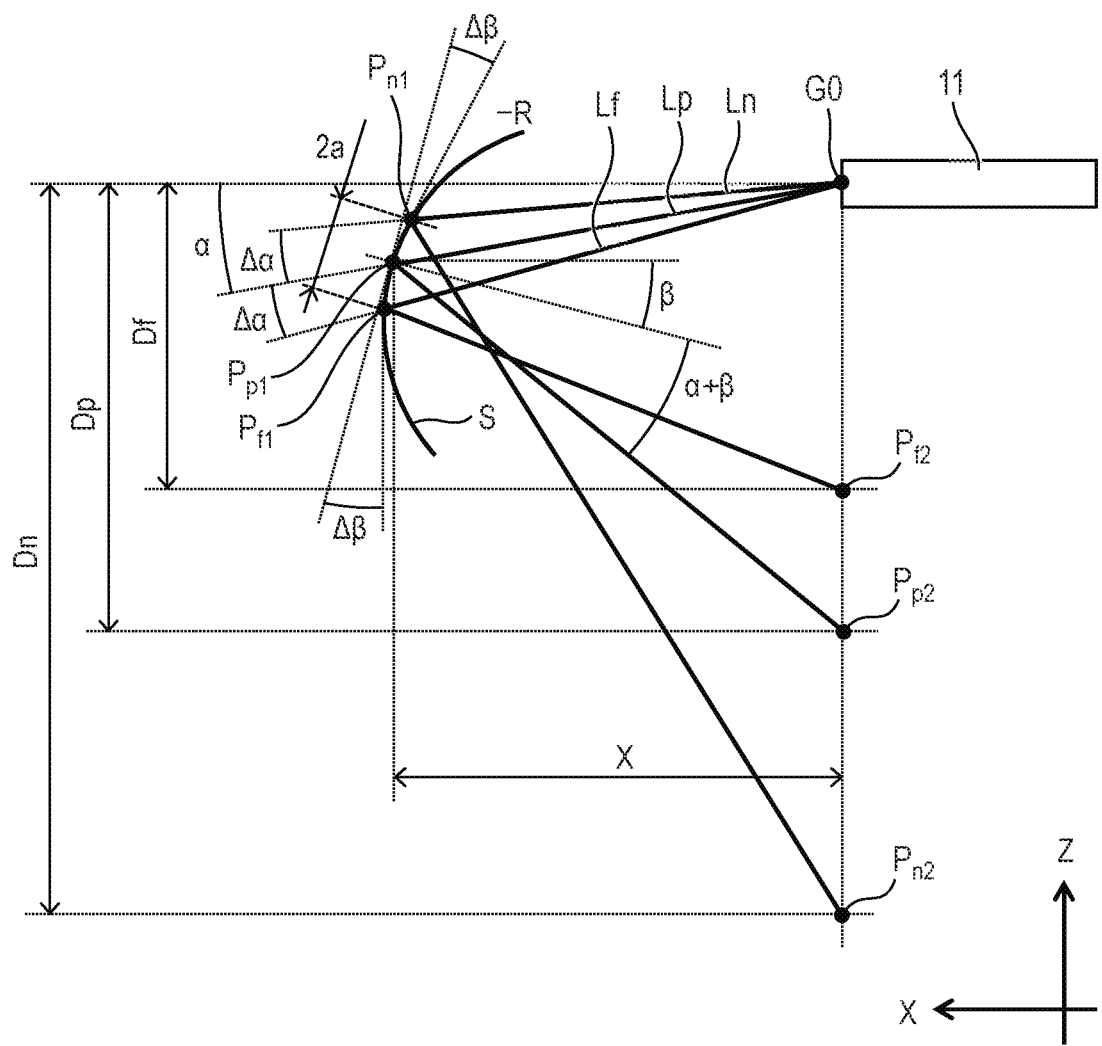
FIG. 5 is a diagram for illustrating how each light beam of a light flux deflected by a deflector is reflected by a lens surface.

FIG. 5 is an illustration for illustrating how each light beam of the on-axis light flux LAon deflected at the deflection point G0 of the deflector 11 is reflected by a lens surface S.

Angles described below are angles formed with respect to the main scanning section when viewed in the sub-scanning section, and a positive direction is individually defined in FIG. 5.

First, as illustrated in FIG. 5, it is assumed that a principal ray Lp of the on-axis light flux LAon deflected at the deflection point G0 enters a position $P_{p1}$ on the lens surface S at an angle $\alpha$. It is assumed here that the position $P_{p1}$ is spaced apart from the deflection point G0 by X in an X direction (first direction or optical axis direction) perpendicular to the first cross section. The angle $\alpha$ is positive in a direction of being spaced apart from the deflecting surface, namely, a counterclockwise direction in the drawing sheet of FIG. 5.

Assuming that an angle formed by a surface normal at the position $P_{p1}$ on the lens surface S (namely, tilt amount) is $\beta$, the principal ray Lp reflected by the lens surface S enters a position $P_{p2}$ on the first cross section at an angle $\alpha+2\beta$. In this case, a separation amount between the deflection point G0 and the position $P_{p2}$ in the first cross section is defined as Dp. The angle $\beta$ is positive in a direction in which the surface normal is spaced apart from the deflecting surface, namely, a clockwise direction in the drawing sheet of FIG. 5.

At this time, the separation amount Dp is expressed as Expression (6).

$$Dp = X \tan \alpha + X \tan(\alpha+2\beta) = X\{\tan \alpha + (\tan \alpha + \tan 2\beta)/(1-\tan \alpha \cdot \tan 2\beta)\} \quad (6)$$

In this case, the angles $\alpha$ and $\beta$ are usually small, and hence Expression (6) can be approximated as Expression (7).

$$Dp \approx X\left[\alpha + \frac{\alpha + 2\beta}{1 - 2\alpha\beta}\right] \quad (7)$$

Next, as illustrated in FIG. 5, it is assumed that, immediately after being deflected at the deflection point G0, a marginal ray Ln on a side closer to the main scanning section including the deflection point G0 enters a position $P_{n1}$ on the lens surface S at an angle $\alpha-\Delta\alpha$. In this case, $\Delta\alpha$ is set to be a positive number.

The marginal ray Ln reflected by the lens surface S enters a position $P_{a2}$ on the first cross section at an angle $(\alpha-\Delta\alpha)+2(\beta+\Delta\beta)$.

In this case, $\Delta\beta$ represents a difference between the angle formed by the surface normal at the position $P_{p1}$ on the lens surface S and an angle formed by a surface normal at the position $P_{n1}$. The symbol $\Delta\beta$ is positive when the lens surface S is concave toward the deflection point G0 side, and is negative when the lens surface S is convex.

A separation amount between the deflection point G0 and the position $P_{n2}$ in the first cross section is defined as Dn.

Similarly, it is assumed that, immediately after being deflected at the deflection point G0, a marginal ray Lf on a side farther from the main scanning section including the deflection point G0 enters a position $P_{f1}$ on the lens surface S at an angle $\alpha+\Delta\alpha$.

The marginal ray Lf reflected by the lens surface S enters a position $P_{f2}$ on the first cross section at an angle $(\alpha+\Delta\alpha)+2(\beta-\Delta\beta)$.

In this case, a separation amount between the deflection point G0 and the position $P_{f2}$ in the first cross section is defined as Df.

At this time, the separation amounts Dn and Df are expressed as Expressions (8a) and (8b) in the same manner as Expression (7).

$$Dn \approx X\left[(\alpha - \Delta\alpha) + \frac{(\alpha - \Delta\alpha) + 2(\beta + \Delta\beta)}{1 - 2(\alpha - \Delta\alpha)(\beta + \Delta\beta)}\right] \quad (8a)$$

$$Df \approx X\left[(\alpha + \Delta\alpha) + \frac{(\alpha + \Delta\alpha) + 2(\beta - \Delta\beta)}{1 - 2(\alpha + \Delta\alpha)(\beta - \Delta\beta)}\right] \quad (8b)$$

Assuming that a curvature radius of the lens surface S in the sub-scanning section at the position $P_{p1}$ being an intersection point between the lens surface S and the principal ray Lp is $-R$ and that a light flux diameter (light flux width in the sub-scanning section) of the on-axis light flux LAon is $2a$, $\Delta\alpha$ and $\Delta\beta$ are expressed as Expressions (9a) and (9b). The lens surface S illustrated in FIG. 5 is a concave surface. The lens surface S is a concave surface when R is positive, and is a convex surface when R is negative.

$$\Delta\alpha \approx \frac{a}{X} \quad (9a)$$

$$\Delta\beta \approx \frac{a}{R} \quad (9b)$$

Thus, Expressions (8a) and (8b) can be rewritten as Expressions (10a) and (10b) through use of Expressions (9a) and (9b), respectively.

$$Dn \approx X\left[\left(\alpha - \frac{a}{X}\right) + \frac{\left(\alpha - \frac{a}{X}\right) + 2\left(\beta + \frac{a}{R}\right)}{1 - 2\left(\alpha - \frac{a}{X}\right)\left(\beta + \frac{a}{R}\right)}\right] \quad (10a)$$

$$Df \approx X\left[\left(\alpha + \frac{a}{X}\right) + \frac{\left(\alpha + \frac{a}{X}\right) + 2\left(\beta - \frac{a}{R}\right)}{1 - 2\left(\alpha + \frac{a}{X}\right)\left(\beta - \frac{a}{R}\right)}\right] \quad (10b)$$

in Expressions (10a) and (10b), $\alpha$, $\beta$, a, X, and R may be set so as to satisfy Expressions (11a), (11b), and (11c).

$$Dp \geq 4 \text{ mm} \quad (11a)$$

$$Dn \geq 4 \text{ mm} \quad (11b)$$

$$Df \geq 4 \text{ mm} \quad (11c)$$

It is to be understood that Expression (11a) is usually satisfied when Expressions (11b) and (11c) are satisfied.

In this case, in order to ensure optical performance of the first scanning optical system 85a, degrees of design freedom for α, a, and X are usually low.

Thus, the light scanning apparatus 10 according to this embodiment is designed so as to satisfy Expressions (11a) to (11c) effectively through use of degrees of design freedom for β and R.

As can be understood from Expressions (10a) and (10b), as a value of β is increased with R and β being set positive, the separation amounts Dn and Df become larger.

Meanwhile, when an orientation of the lens surface S is changed so that β becomes negative, that is, when a normal direction of the lens surface S is rotated counterclockwise, the separation amounts Dn and Df become smaller.

In addition, when the lens surface S is se convex so that R becomes negative, the separation amount Df becomes larger while the separation amount Dn becomes smaller, and hence it becomes difficult to satisfy Expressions (11b) and (11c) at the same time.

Thus, it is effective for satisfying Expressions (11a) to (11c) to tilt the lens surface S so that β becomes positive (tilt the lens surface S so that the reflected on-axis light flux LAon is spaced apart from the deflector 11), and to set the lens surface S concave so that R becomes positive, that is, to set the lens surface S to a curved surface having a concave shape.

As described above, a has a low degree of design freedom, and hence Expressions (11a) to (11c) are set to be satisfied even under a condition of α=0°, to thereby obtain an effect of this embodiment with a margin.

Thus, in the light scanning apparatus 10 according to this embodiment, Expressions (12a), (12b), and (12c) obtained by substituting α=0° into Expressions (7), (10a), and (10b) may be used to set β, a, X, and R so as to satisfy Expressions (11a) to (11c).

$$Dp \approx 2X\beta \tag{12a}$$

$$Dn \approx X\left[-\frac{a}{X} + \frac{-\frac{a}{X} + 2\left(\beta + \frac{a}{R}\right)}{1 + \frac{2a}{X}\left(\beta + \frac{a}{R}\right)}\right] \tag{12b}$$

$$Df \approx X\left[\frac{a}{X} + \frac{\frac{a}{X} + 2\left(\beta - \frac{a}{R}\right)}{1 - \frac{2a}{X}\left(\beta - \frac{a}{R}\right)}\right] \tag{12c}$$

In the above-mentioned derivation, the angles α and β take signs reverse to each other for the sake of convenience, but the same results can be obtained even when the angles α and β take the same sign as each other with α being replaced by (−α) or β being replaced by (−β) in the above-mentioned derivation.

Next, results of the above-mentioned calculation for the reflection of the on-axis light flux LAon by the first fθ lens 1006 provided to the light scanning apparatus 10 according to this embodiment are described.

In the light scanning apparatus 10 according to this embodiment, X=17,156 mm, R=17 mm, α=3.0° (0.052 rad), β=8.36° (0.146 rad), and 2a=0.34 mm are satisfied when the on-axis light flux LAon deflected by the deflector 11 is reflected by the incident surface 1006a of the first fθ lens 1006.

Thus, Dp=6.90 mm. Dn=6.89 mm, and Df=6.90 mm can be calculated from Expressions (7), (10a), and (10b).

In this case, in the light scanning apparatus 10 according to this embodiment, the fact that Dn<Df means that the focusing point of the on-axis light flux LAon does not fall between the second cross section and the first cross section.

In other words, in the light scanning apparatus 10 according to this embodiment, the fact that Dn<Df means that the principal ray and the marginal ray of the on-axis light flux LAon do not intersect each other between the YZ cross section including the reflection point of the principal ray of the on-axis light flux LAon on the incident surface 1006a and the YZ cross section including the deflection point G0.

In addition, Dp=7.05 mm, Dn=7.04 mm, and Df=7.06 mm are calculated from the simulation through use of the specification values in the light scanning apparatus 10 according to this embodiment shown in Table 1 and Table 2, and are found to be almost in agreement with the above-mentioned results. At this time, the separation amount Dn corresponds to the separation amount D1 illustrated in FIG. 3B.

Further, Dp=5.01 mm, Dn=5.00 mm, and Df=5.02 mm can be calculated from Expressions (12a), (12b), and (12c).

Thus, it is understood that Expressions (11a) to (11c) are satisfied with a margin in the reflection by the incident surface 1006a of the first fθ lens 1006 in the light scanning apparatus 10 according to this embodiment.

Further, in the light scanning apparatus 10 according to this embodiment, X=23,885 mm, R=14.556 mm, α=−0.96° (−0.017 rad), β=11.73° (0.205 rad), and 2a=0.47 mm are satisfied when the on-axis light flax LAon deflected by the deflector 11 is reflected by the exit surface 1006b of the first fθ lens 1006.

Thus, Dp=8.92 mm, Dn=9.1.7 mm, and Df=8.66 mm can be calculated from Expressions (7). (10a), and (10b).

Meanwhile, Dp=16.21 mm, Dn=15.43 min, and Df=17.02 mm are calculated from the simulation through use of the specification values in the light scanning apparatus 10 according to this embodiment shown in Table 1 and Table 2, and are found not to be in agreement with the above-mentioned results.

This is because it is not taken into consideration in the above-mentioned derivation that a light beam reflected by the exit surface 1006b of the first fθ lens 1006 is refracted by the incident surface 1006a.

However, the above-mentioned basic idea can be qualitatively applied to the reflection by the exit surface 1006b of the first fθ lens 1006 in the same manner. Thus, it is effective to tilt the exit surface 1006b so that β becomes positive and to set the exit surface 1006b concave so that R becomes positive.

At this time, the separation amount Dn corresponds to the separation amount D2 illustrated in FIG. 4B.

As described above, discussion of the light scanning apparatus 10 according to this embodiment is directed to the reflection by the first fθ lens 1006 being one of the first and second fθ lenses 1006 and 1007 that is arranged closest to the deflector 11.

This is because, as a lens has a smaller distance from the deflection point G0, divergence of a reflected light beam becomes smaller, and the reflected light having a higher intensity tends to reach the deflector 11.

Meanwhile, the effects of this embodiment can be obtained even by the second fθ lens 1007 having a larger distance from the deflection point G0.

However, the light beam is diverged in the reflection by the second fθ lens 1007 provided in such a long distance. This reduces the intensity of unnecessary light reaching the deflector 11, and enables to perform the light shielding between the first fθ lens 1006 closest to the deflector 11 and the second fθ lens 1007 by a method different from the above-mentioned method.

Thus, demand for applying the light-shielding configuration in this embodiment to the second fθ lens 1007 becomes low.

In addition, as discussed above, the reflected light from a lens surface close to the deflector 11 tends to become a problem, and hence in the light scanning apparatus 10 according to this embodiment, the light-shielding method in this embodiment is effective against the reflected light from the incident surface 1006*a* of the first fθ lens 1006.

However, in the light scanning apparatus employing this embodiment, the incident surface 1006*a* of the first fθ lens 1006, which is the lens surface on a side closer to the deflector 11, has a shape determined so as to ensure imaging performance including the sub-scanning magnification of the first scanning optical system 85*a*. This leads to a possibility in that the incident surface 1006*a* of the first ID lens 1006 cannot be designed in such a manner as in this embodiment.

Meanwhile, the exit surface 1006*b* of the first 11) lens 1006 generally has a high degree of design freedom, and is easily designed in such a manner as in this embodiment.

Thus, in order to obtain the effects of this embodiment, it is also effective to design at least the exit surface 1006*b* of the first fθ lens 1006 in such a manner as in this embodiment.

In the light scanning apparatus 10 according to this embodiment, the incident surface 1006*a* and the exit surface 1006*b* of the first fθ lens 1006 are preferred to be tilted in the same direction as each other and to have curvatures in the same direction as each other.

In other words, in the light scanning apparatus 10 according to this embodiment, the first fθ lens 1006 is preferred to have a meniscus shape, that is, the incident surface 1006*a* and the exit surface 1006*b* are preferred to have powers having signs different from each other.

In the light scanning apparatus 10 according to this embodiment, the first fe lens 1006 is designed in this manner, to thereby easily enable reduction of unnecessary light from both the incident surface 1006*a* and the exit surface 1006*b*.

Meanwhile, from the viewpoint of the imaging performance of the first scanning optical system 85*a*, when the incident surface 1006*a* and the exit surface 10068 of the first fθ lens 1006 have tilt directions opposite to each other, a difference between the optical paths of the marginal rays becomes larger, and there is a possibility in that aberration may increase.

In the same manner, when the incident surface 1006*a* and the exit surface 1006*b* of the first fθ lens 1006 have tilts and have curvature in directions reverse to each other, that is, have powers having the same sign as each other, the difference between the optical paths of the marginal rays accordingly becomes much larger. This leads to the possibility in that the aberration may increase.

Thus, also from the viewpoint of the imaging performance, the incident surface 1006*a* and the exit surface 1006*b* of the first fθ lens 1006 are preferred to be tilted in the same direction as each other and to have curvatures in the same direction as each other.

In the above-mentioned simulation results obtained by the light scanning apparatus 10 according to this embodiment, Dn<Df is slightly satisfied, that is, the on-axis light flux LAon reflected by the first fθ lens 1006 enters the light-shielding portion 1500 as convergent light.

In the light scanning apparatus 10 according to this embodiment, the first ID lens 1006 is designed in this manner, to thereby be able to reduce a width of the light-shielding surface 1500*a* of the light-shielding portion 1500 in the sub-scanning direction to a size smaller than the light flux diameters on the incident surface 1006*a* and the exit surface 1006*b* of the first fθ lens 1006.

In addition, in the light scanning apparatus 10 according to this embodiment, it is possible to obtain an effect that, even when a position of the light-shielding portion 1500 is displaced in the X direction perpendicular to the first cross section due to a layout error, the light flux diameter is less liable to greatly change on the light-shielding surface 1500*a* of the light-shielding portion 1500.

Meanwhile, when the on-axis light flux LAon reflected by the first ID lens 1006 enters the light-shielding portion 1500 as divergent light, the width of the light-shielding surface 1500*a* of the light-shielding portion 1500 in the sub-scanning direction is required to be set larger than the light flux diameters on the incident surface 1006*a* and the exit surface 1006*b* of the first fθ lens 1006.

In addition, in a case where the on-axis light flux LAon is reflected by the first fθ lens 1006, is temporarily condensed before entering the light-shielding portion 1500, and then enters the light-shielding portion 1500 as divergent light, when the position of the light-shielding portion 1500 is displaced in the X direction due to a layout error, there is a possibility in that the light flux diameter may greatly change on the light-shielding surface 1500*a* of the light-shielding portion 1500.

From the above description, it is not preferred to cause the on-axis light flux LAon reflected by the first fθ lens 1006 to enter the light-shielding portion 1500 as divergent light.

The unnecessary light obtained when the on-axis light flux LAon is reflected by the first fθ leas 1006 has been discussed above, but the following discussion is directed to unnecessary light obtained when an off-axis light flux is reflected by the first fθ lens 1006.

The reflected light of the off-axis light flux has an angle with respect to the sub-scanning section in the main scanning section, and hence there is a high possibility in that the reflected light is blocked by hitting, for example, a side wall of the housing 1401. Thus, as compared with the reflected light of the on-axis light flux LAon, the possibility of reaching the deflector 11 or the third and fourth scanned surfaces 1108 and 1308 becomes lower, which hardly causes a problem.

However, the effects of this embodiment can be further obtained when consideration is given to the reflected light of the off-axis light flux as well.

Figure 6A:
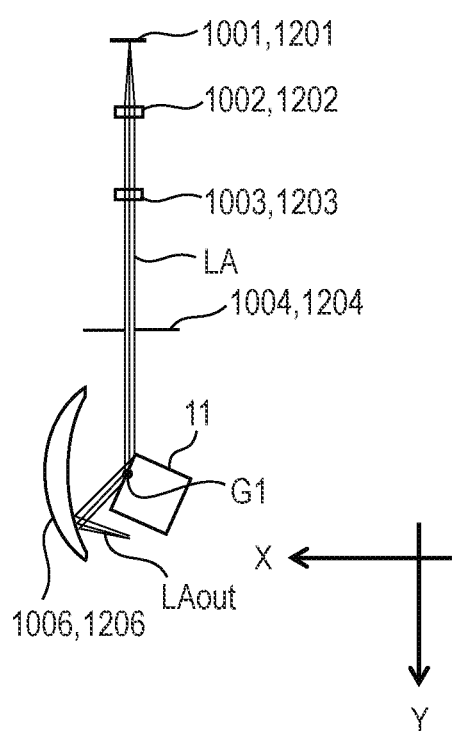
FIG. 6A is a partial main scanning sectional view of the light scanning apparatus according to this embodiment.
Figure 6B:
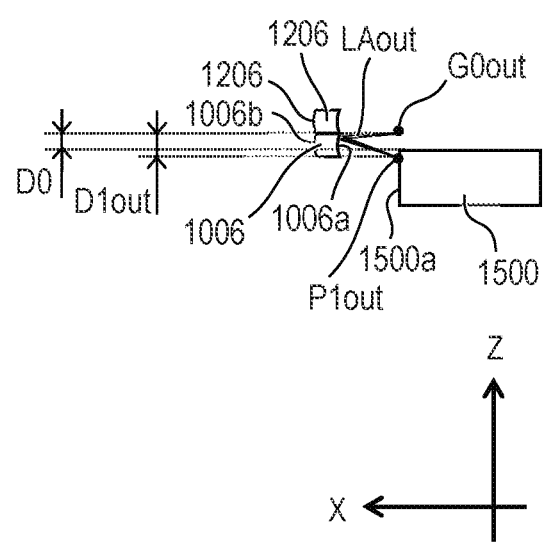
FIG. 6B is a partial sub-scanning sectional view of the light scanning apparatus according to this embodiment.
Figure 7A:
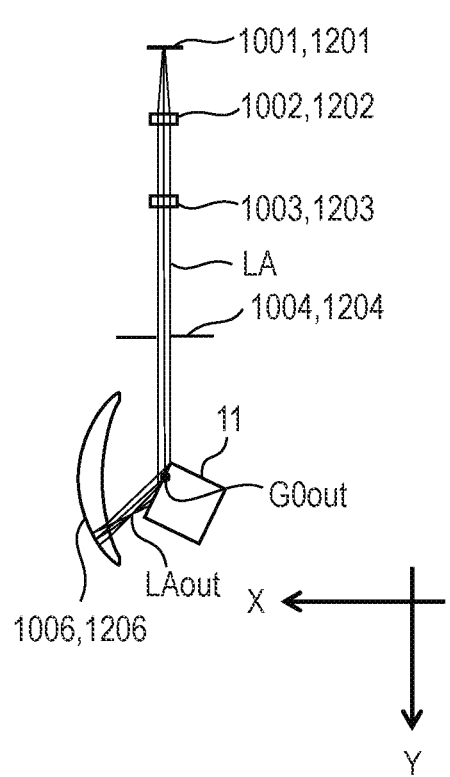
FIG. 7A is a partial main scanning sectional view of the light scanning apparatus according to this embodiment.
Figure 7B:
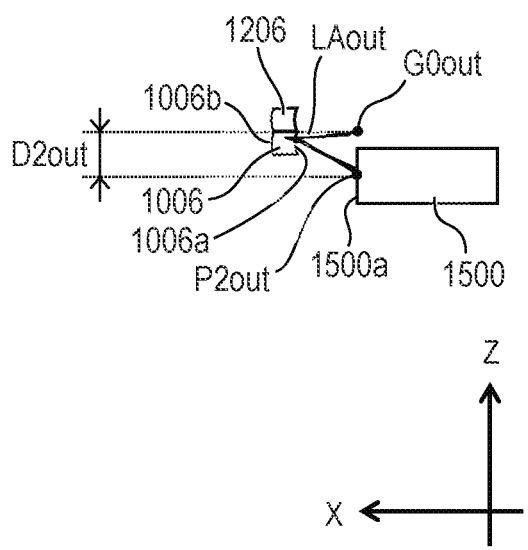
FIG. 7B is a partial sub-scanning sectional view of the light scanning apparatus according to this embodiment.

FIG. 6A and FIG. 7A are each a partial main scanning sectional view of the light scanning apparatus 10 according to this embodiment, FIG. 6B and FIG. 7B are each a partial sub-scanning sectional view of the light scanning apparatus 10 according to this embodiment.

In FIG. 6A and FIG. 6B, there is also illustrated an optical path exhibited when a most off-axis light flux LAout that has been emitted from the first light source 1001 and has been deflected by the deflector 11 is reflected by the incident surface 1006*a* of the first fθ lens 1006.

Similarly, in FIG. 7A and FIG. 7B, there is also illustrated an optical path exhibited when the most off-axis light flux LAout that has been emitted from the first light source 1001 and has been deflected by the deflector 11 is reflected by the exit surface 1006*b* of the first fθ lens 1006.

In this case, the most off-axis light flux LAout refers to the light flux LA for scanning a most off-axis image height by being deflected while the deflector 11 is rotated by 22.57° from the position illustrated in FIG. 3A and FIG. 4A in the main scanning section.

In FIG. 6B and FIG. 7B, optical paths projected on the sub-scanning section are illustrated.

As illustrated in FIG. 6B, the most off-axis light flux LAout reflected by the incident surface 1006a of the first fθ lens 1006 reaches a position P1out spaced apart from a deflection point G0out (second deflection point) in the sub-scanning direction by a separation amount D1out in a fourth cross section (YZ cross section) including the deflection point G0out of the most off-axis light flux LAout by the deflector 11 and being perpendicular to the main scanning section (XY cross section) and the sub-scanning section (XZ cross section).

In this case, the separation amount D1out is evaluated by a light beam that reaches the position P1out closest to the deflection point G0out in the fourth cross section in the most off-axis light flux LAout reflected by the incident surface 1006a of the first fit lens 1006.

As illustrated in FIG. 7B, the most off-axis light flux LAout reflected by the exit surface 1006h of the first fθ lens 1006 reaches a position P2out spaced apart from the deflection point G0out in the sub-scanning direction by a separation amount D2out in the fourth cross section.

In this case, the separation amount D2out is evaluated by a light beam that reaches the position P2out closest to the deflection point G0out on the fourth cross section in the most off-axis light flux LAout reflected by the exit surface 1006b of the first fθ lens 1006.

The light scanning apparatus 10 according to this embodiment is preferred to include the light-shielding portion 1500 so as to block the most off-axis light fluxes LAout reaching the positions P1out and P2out.

Thus, the most off-axis light fluxes LAout reflected by the incident surface 1006a and the exit surface 1006b of the first fθ lens 1006 can be blocked by the light-shielding portion 1500, and influences of unnecessary light from the incident surface 1006a and the exit surface 10060 of the first fθ lens 1006 are reduced.

It is preferred that the light scanning apparatus 10 according to this embodiment be designed so as to satisfy Expressions (13a) and (13b).

$$D1out \geq 4 \text{ mm} \tag{13a}$$

$$D2out \geq 4 \text{ mm} \tag{13b}$$

In other words, in the light scanning apparatus 10 according to this embodiment, it is preferred that a marginal ray on a side closer to the deflection point G0out on the fourth cross section, the marginal ray being included in the most off-axis light flux LAout (reflected most off-axis light flux) reflected by each of the incident surface 1006a and the exit surface 1006b of the first fθ lens 1006 after being deflected at the deflection point G0out on the deflector 11, travel toward a position on the fourth cross section spaced apart from the deflection point G0out in the sub-scanning direction by 4 mm or more.

Next, results of the calculation for the reflection of the most off-axis light flux LAout by the first fθ lens 1006 provided to the light scanning apparatus 10 according to this embodiment are described.

In the light scanning apparatus 10 according to this embodiment, Xout=15,139 mm, Rout=30.67 mm, αout=3.0° (0.052 rad), βout=7.38° (0.129 rad), and 2aout=0.42 mm are satisfied when the most off axis light flux LAout deflected by the deflector 11 is reflected by the incident surface 1006a, of the first fθ lens 1006.

In this case, it is assumed that a principal ray Lpout of the most off-axis light flux LAout deflected at the deflection point G0out enters a position $P_{p1out}$ on the lens surface S at an angle αout. It is assumed here that the position $P_{p1out}$ is spaced apart from the deflection point G0out by Xout in the X direction (first direction) perpendicular to the fourth cross section.

Assuming that an angle formed by a surface normal at the position $P_{p1out}$ on the lens surface S is Pout, the principal ray Lpout reflected by the lens surface S enters a position $P_{p2out}$ on the fourth cross section at an angle αout+2βout. In this case, a separation amount between the deflection point G0out and the position $P_{p2out}$ is defined as Dpout.

In the same manner, it is assumed that, immediately after being deflected at the deflection point G0out, a marginal ray Lnout on a side closer to the main scanning section including the deflection point G0out enters a position Putout on the lens surface S at an angle αout−Δαout.

The marginal ray Lnout reflected by the lens surface S enters a position $P_{n2out}$ on the fourth cross section at an angle (αout−Δαout)+2(βout±Δβout).

In this case, Δβout represents a difference between the angle formed by the surface normal at the position $P_{p1out}$ on the lens surface S and an angle formed by a surface normal at the position $P_{n1out}$. A separation amount between the deflection point G0out and the position $P_{n2out}$ is defined as Dnout.

Further, it is assumed that, immediately after being deflected at the deflection point G0out, a marginal ray Lfout on a side farther from the main scanning section including the deflection point G0out enters a position $P_{f1out}$ on the lens surface S at an angle αout+Δαout.

The marginal ray Lfout reflected by the lens surface S enters a position $P_{f2out}$ on the fourth cross section at an angle (αout+Δαout)+2(βout−Δβout).

In this case, a separation amount between the deflection point G0out and the position $P_{f2out}$ is defined as Dfout.

It is also assumed that a curvature radius of the lens surface S in the sub-scanning section at the position $P_{p1out}$ being an intersection point between the lens surface S and the principal ray Lpout is −Rout and that a light flux diameter of the most off-axis light flux LAout is 2aout.

At this time. Dpout=5.41 mm, Dnout=5.61 mm, and Dfout=5.22 mm are calculated from the simulation through use of the specification values in the light scanning apparatus 10 according to this embodiment shown in Table 1 and Table 2. At this time, the separation amount Dfout corresponds to the separation amount D1out.

Further, in the light scanning apparatus 10 according to this embodiment, Xout=18, 901 ram, Rout=19.173 mm, αout=−091° (−0.016 rad), βout=0.17° (0.178 rad), and 2aout=0.50 mm are satisfied when the most off-axis light flux LAout deflected by the deflector 11 is reflected by the exit surface 1006b of the first fθ lens 1006.

At this time, Dpout=1.0.17 mm, Dnout=9.81 mm, and Dfout=10.53 mm can be calculated from the simulation through use of the specification values in the light scanning apparatus 10 according to this embodiment shown in Table 1 and Table 2. At this time, the separation amount Dnout corresponds to the separation amount D2out.

Thus, it is understood that Expressions (13a) and (13b) are satisfied in the reflection of the most off-axis light flux LAout by the incident surface 1006a and the exit surface 1006*b* of the first fθ lens 1006 in the light scanning apparatus 10 according to this embodiment.

The light scanning apparatus 10 according to this embodiment is preferred to be designed so as to satisfy Expressions (14a) and (14b).

$$D1out \geq D0 \geq 4 \text{ mm} \quad (14a)$$

$$D2out \geq D0 \geq 4 \text{ mm} \quad (14h)$$

Thus, the most off-axis light flux LAout can be blocked by the end portion of the light-shielding portion 1500 on the first fθ lens 1006 side, namely, the light-shielding surface 1500*a*. Accordingly, the effect of suppressing a generation of unnecessary light is enhanced on the side opposite to the first scanning optical system 85*a* with respect to the deflector 11, namely, in the right-side scanning system 10R.

As described above, in the light scanning apparatus 10 according to this embodiment, it is possible for the light-shielding portion 1500 to sufficiently block light fluxes including the on-axis light flux LAon and the most off-axis light flux LAout that are reflected by the incident surface 1006*a* and the exit surface 1006*b* of the firstfθ lens 1006.

Accordingly, it is possible to provide the light scanning apparatus 10 in which the influences of unnecessary light on the side opposite to the first scanning optical system 85*a* with respect to the deflector 11, namely, on the right-side scanning system 10R have been greatly reduced.

In addition, sub-scanning light flux widths Wr1out and Wd1out of the most off-axis light flux LAout reflected by the incident surface 1006*a* of the first fθ lens 1006 on the incident surface 1006*a* and on the position P1out are 0.42 mm and 0.39 ram, respectively.

That is, the sub-scanning light flux width Wd1out on the position P1out is smaller than the sub-scanning light flux width Wr1out on the incident surface 1006*a*, and hence a size of the light-shielding portion 1500 in the sub-scanning direction can be reduced by this configuration.

Similarly, sub-scanning light flux widths Wr2out and Wd2out of the most off-axis light flux LAout reflected by the exit surface 1006*b* of the first ID lens 1006 on the exit surface 1006*b* and on the position P2out are 0.50 mm and 0.72 mm, respectively.

That is, the sub-scanning light flux width Wd2out on the position P2out is larger than the sub-scanning light flux width Wr2out on the exit surface 1006*b*.

Such a configuration is disadvantageous for reducing the size of the light-shielding portion 1500, but the light scanning apparatus 10 according to this embodiment is designed so that the separation amount D2out is sufficiently large, and hence the configuration causes no problem.

In the light scanning apparatus 10 according to this embodiment, in order to cause an irradiation position on the first scanned surface 1008 by the first scanning optical system 85*a* to be uniform in the main scanning direction, it is preferred that a tilt amount of each of the incident surface 1006*a* and the exit surface 1006*b* of the first fθ lens 1006 at a passing position of the most off-axis light flux be smaller than a tilt amount thereof at a passing position of the on-axis light flux LAon.

In other words, in the light scanning apparatus 10 according to this embodiment, the tilt amount of the incident surface 1006*a* at the reflection point (second reflection point) of the principal ray of the most off-axis light flux LAout, which has been deflected at the deflection point G0out on the deflector 11, in the sub-scanning section is preferred to be smaller than the tilt amount of the incident surface 1006*a* at the reflection point (first reflection point) of the principal ray of the on-axis light flux LAon in the sub-scanning section.

That is, in the light scanning apparatus 10 according to this embodiment, the angle βout tends to be smaller than the angle β, and hence in order to enable the off-axis light flux reflected by the first fθ lens 1006 to be sufficiently blocked as well, the light scanning apparatus 10 is preferred to be designed so that the angle β is larger.

In the same manner, in the light scanning apparatus 10 according to this embodiment, in order to cause a spot diameter on the first scanned surface 1008 by the first scanning optical system 85*a* in the sub-scanning direction to be uniform in the main scanning direction, it is preferred that the curvature radius of each of the incident surface 1006*a* and the exit surface 1006*b* of the first fθ lens 1006 at the passing position of the most off-axis light flux be looser (larger) than the curvature radius thereof at the passing position of the on-axis light flux LAon.

In other words, in the light scanning apparatus 10 according to this embodiment, it is preferred that an absolute value of a power of each of the incident surface 1006*a* and the exit surface 1006*b* at each of the reflection points of the principal ray of the most on-axis light flux LAout, which has been deflected at the deflection point G0out on the deflector 11, in the sub-scanning section be smaller than an absolute value of a power of each of the incident surface 1006*a* and the exit surface 1006*b* at each of the reflection points of the principal ray of the on-axis light flux LAon in the sub-scanning section.

That is, in the light scanning apparatus 10 according to this embodiment, the curvature radius Rout tends to be larger than the curvature radius R. Thus, in order to enable the off-axis light flux reflected by the first fθ lens 1006 to be sufficiently blocked as well, the light scanning apparatus 10 is preferred to be designed so that the curvature radius R is small.

However, it is to be understood that, when the curvature radius R is set too small, the separation amount Df becomes as small as to cause the on-axis light flux LAon to become a divergent light flux on the first cross section, and it is no longer possible for the light-shielding portion 1500 to block unnecessary light.

Further, as described above, the effects of this embodiment obtained by tilting the lens surface and designing the lens surface as a concave surface can also be obtained through use of a diffraction surface.

Specifically, the effect equivalent to that obtained by tilting the lens surface can also be obtained by providing a diffraction surface having a constant structural period.

The term "diffraction surface having a constant structural period" referred to herein means a diffraction surface for which a distance from a center of a diffraction grating formed on the diffraction surface to a k-th grating portion along the sub-scanning direction is expressed by a linear expression of k.

The effect equivalent to that obtained by forming the lens surface as a concave surface can also be obtained by providing a diffraction surface having a structural period being changed by a quadratic function.

The term "diffraction surface having a structural period being changed by a quadratic function" referred to herein means a diffraction surface for which a distance from the center of the diffraction grating formed on the diffraction surface to the k-th grating portion along the sub-scanning direction is expressed by a quadratic expression of k.

Thus, the effect of this embodiment can also be obtained by designing the lens surface so as to have a shape that combines a diffraction surface and a curved surface.

As illustrated in FIG. 1A, the light scanning apparatus 10 according to this embodiment is configured to scan the first and second scanned surfaces 1008 and 1208 and the third and fourth scanned surfaces 1108 and 1308 that are arranged so as to be opposed to each other with the deflector 11 interposed therebetween.

In such a configuration, the reflected light from the lens surface provided to one of the left-side scanning system 10L and the right-side scanning system 10R tends to reach the other on the opposite side with respect to the deflector 11 as unnecessary light, which becomes a problem.

Thus, when the light scanning apparatus 10 according to this embodiment is designed in such a manner as described above, it is possible to reduce such unnecessary light.

Further, in the light scanning apparatus 10 according to this embodiment, the optical axis of the first incident optical system 75a forms an angle of 3.0° with respect to the main scanning section when viewed in the sub-scanning section. That is, in the light scanning apparatus 10 according to this embodiment, the light flux LA that has passed through the first incident optical system 75a is obliquely incident on the deflector 11 at an angle of 3.0°.

When the light scanning apparatus 10 according to this embodiment is designed in such a manner as described above, the light flux LA deflected by the deflector 11 travels toward the first fθ lens 1006 at an angle of 3.0°.

Thus, the angle β can be set smaller on each of the incident surface 1006a and the exit surface 1006b of the first θθ lens 1006 than in a case of α=0°.

As a result, in the light scanning apparatus 10 according to this embodiment, a difference between the optical paths of marginal rays can be reduced, which is advantageous from the viewpoint of aberration.

When the first fθ lens 1006 is designed so that β becomes smaller from the viewpoint of aberration, the separation amount including Dp becomes smaller with the influence of unnecessary light becoming larger, and hence the light-shielding method in this embodiment becomes more effective.

When the light scanning apparatus 10 according to this embodiment is designed in such a manner as described above, the light reflected by the lens surface provided to one scanning optical system and traveling toward the deflector 11 and the other scanning optical system on the opposite side with respect to the deflector 11 can be reduced.

This enables the light scanning apparatus 10 according to this embodiment to greatly reduce the influence of such unnecessary light.

While an exemplary embodiment has been described, it is to be understood that the present invention is not limited to the disclosed exemplary embodiment, and various modifications and changes can be made thereto without departing from the gist thereof.

[Image Forming Apparatus]

Figure 8:
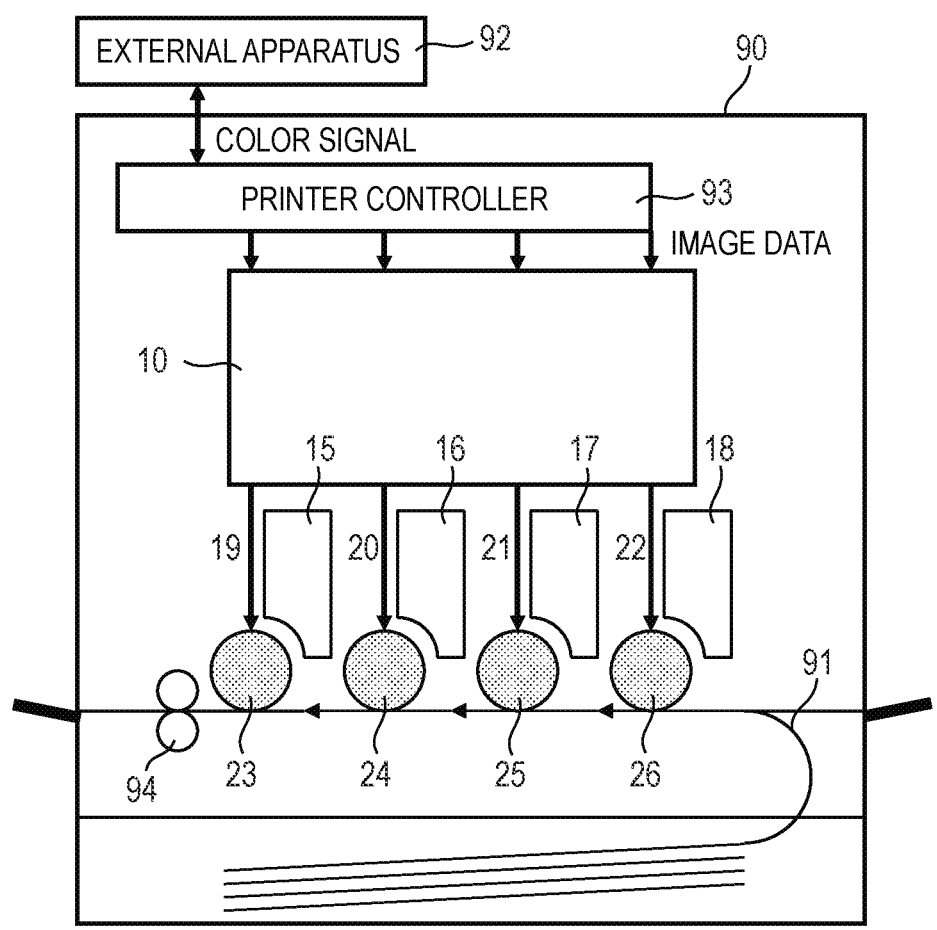
FIG. 8 is a sub-scanning sectional view of a main part of a color image forming apparatus according to this embodiment.

FIG. 8 is a sub-scanning sectional view of a main part of a color image forming apparatus 90 to which the light scanning apparatus 10 according to this embodiment is mounted.

The image forming apparatus 90 is a tandem-type color image forming apparatus configured to record image information on a photosensitive surface of each photosensitive drum being an image bearing member through use of the light scanning apparatus 10 according to this embodiment.

The image forming apparatus 90 includes the light scanning apparatus 10 according to this embodiment, photosensitive drums (photosensitive bodies) 23, 24, 25, and 26 each being an image bearing member, and developing units 15, 16, 17, and 18. The image forming apparatus 90 also includes a conveying belt 91, a printer controller 93, and a fixing unit 94.

Color signals (pieces of code data) of red (R), green (G), and blue (B) output from an external apparatus 92, for example, a personal computer is input to the image forming apparatus 90.

The input color signals are converted into pieces of image data (dot data) on cyan (C), magenta (M), yellow (Y), and black (K) by the printer controller 93 in the image forming apparatus 90.

The converted pieces of image data are each input to the light scanning apparatus 10. Then, light beams 19, 20, 21, and 22 modulated based on the pieces of image data are emitted from the light scanning apparatus 10, and the photosensitive surfaces of the photosensitive drums 23, 24, 25, and 26 are exposed to those light beams.

Charging rollers (not show configured to uniformly charge the surfaces of the photosensitive drums 23, 24, 25, and 26 are provided so as to be brought into abutment against the surfaces. Meanwhile, the light scanning apparatus 10 is configured to irradiate the surfaces of the photosensitive drums 23, 24, 25, and 26 charged by the charging rollers with the light beams 19, 20, 21, and 22.

As described above, the light beams 19, 20, 21, and 22 are modulated based on the pieces of image data on the respective colors, and the photosensitive drums 23, 24, 25, and 26 are irradiated with the light beams 19, 20, 21, and 22, to thereby form electrostatic latent images on the surfaces of the photosensitive drums 23, 24, 25, and 26. The formed electrostatic latent images are developed as toner images by the developing units 15, 16, 17, and 18 arranged so as to be brought into abutment against the photosensitive drums 23, 24, 25, and 26.

The toner images developed by the developing units 15 to 18 are transferred onto a sheet (a transferred material) (not shown) being conveyed on the conveying belt 91 in a superimposed manner by transferring rollers (transferring units) (not shown) arranged so as to be opposed to the photosensitive drums 23 to 26, to thereby form one full-color image.

As described above, the sheet onto which the unfixed toner images have been transferred is further conveyed to the fixing unit 94 provided on downstream of the photosensitive drums 23, 24, 25, and 26 (on the left side of FIG. 8). The fixing unit 94 is formed of a fixing roller including, in its inside, a fixing heater (not show and a pressure roller arranged so as to be brought into pressure contact with the fixing roller. The unfixed toner images on the sheet are fixed by heating the sheet conveyed from a transferring portion while pressurizing the sheet by a pressure contact portion between the fixing roller and the pressure roller. In addition, discharging rollers (not shown) are arranged on further downstream of the fixing roller, and are configured to discharge the sheet subjected to the fixing to the outside of the image forming apparatus 90.

The color image forming apparatus 90 is configured to record image signals (pieces of image information) on the photosensitive surfaces of the photosensitive drums 23, 24, 25, and 26 corresponding to the respective colors of C, M, Y, and K through use of the light scanning apparatus 10, and to print a color image at high speed.

As the external apparatus 92, for example, a color image reading apparatus including a CCD sensor may be used. In this case, this color image reading apparatus and the color image forming apparatus 90 form a color digital copying machine.

According to the present invention, it is possible to provide a light scanning apparatus capable of reducing unnecessary light reaching a scanned surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-004152, filed Jan. 15, 2020, which is hereby incorporated by reference herein in its entirety.

What is claimed is:

1. A light scanning apparatus comprising:
a deflector configured to deflect a light flux to scan a scanned surface; and
an imaging optical element including an optical surface and configured to guide the light flux from the deflector to the scanned surface,
wherein a first cross section is a section including a first deflection point on the deflector and being perpendicular to an optical axis of the imaging optical element, and a first marginal ray is a ray on a side closer to the first deflection point in the first cross section, the first marginal ray being included in an on-axis light flux reflected by the optical surface after being deflected at the first deflection point,
wherein the light scanning apparatus is configured to cause the first marginal ray to travel toward a position spaced apart from the first deflection point in a sub-scanning direction by 4 mm or more in the first cross section, and
wherein a width of the on-axis light flux on the first cross section in the sub-scanning direction is smaller than a width of the on-axis light flux on the optical surface in the sub-scanning direction.

2. The light scanning apparatus according to claim 1, wherein the width of the on-axis light flux on the first cross section in the sub-scanning direction is equal to or smaller than ½ of the width of the on-axis light flux on the optical surface in the sub-scanning direction.

3. The light scanning apparatus according to claim 1, wherein a focusing point of the on-axis light flux is not located between the first cross section and a second cross section including a first reflection point of a principal ray of the on-axis light flux on the optical surface and being perpendicular to the optical axis of the imaging optical element.

4. The light scanning apparatus according to claim 1, further comprising a light-shielding member configured to block the on-axis light flux,
wherein an incident angle of a principal ray of the on-axis light flux with respect to a light-shielding surface of the light-shielding member is equal to or smaller than 45°.

5. The light scanning apparatus according to claim 4, wherein the light-shielding member is provided to a holding member configured to hold the deflector.

6. The light scanning apparatus according to claim 4, wherein an optical element is not provided on an optical path of the on-axis light flux between a second cross section including a first reflection point of the principal ray of the on-axis light flux on the optical surface and being perpendicular to the optical axis of the imaging optical element and a third cross section including the light-shielding surface.

7. The light scanning apparatus according to claim 4, wherein the light-shielding surface is arranged on a side opposite to the imaging optical element with respect to the first deflection point in a main scanning section.

8. The light scanning apparatus according to claim 1, wherein the imaging optical element is an imaging optical element arranged closest to the deflector.

9. The light scanning apparatus according to claim 1, wherein the optical surface is an incident surface of an imaging optical element arranged closest to the deflector.

10. The light scanning apparatus according to claim 1, wherein the optical surface has a curved line shape that is concave toward the deflector in a sub-scanning section.

11. The light scanning apparatus according to claim 1, wherein the optical surface is tilted in a sub-scanning section so that the on-axis light flux is spaced apart from the deflector.

12. The light scanning apparatus according to claim 1, wherein an incident surface and an exit surface of the imaging optical element are tilted in the same direction as each other in a sub-scanning section.

13. The light scanning apparatus according to claim 1, wherein an incident surface and an exit surface of the imaging optical element each have a curved line shape that is concave toward the deflector in a sub-scanning section.

14. The light scanning apparatus according to claim 1, wherein the following conditions are satisfied:

$$X\left[\alpha + \frac{\alpha - 2\beta}{1 + 2\alpha\beta}\right] \geq 4 \text{ mm},$$

$$X\left[\left(\alpha - \frac{a}{X}\right) + \frac{\left(\alpha - \frac{a}{X}\right) + 2\left(-\beta + \frac{a}{R}\right)}{1 - 2\left(\alpha - \frac{a}{X}\right)\left(-\beta + \frac{a}{R}\right)}\right] \geq 4 \text{ mm, and}$$

$$X\left[\left(\alpha + \frac{a}{X}\right) + \frac{\left(\alpha + \frac{a}{X}\right) + 2\left(-\beta - \frac{a}{R}\right)}{1 - 2\left(\alpha + \frac{a}{X}\right)\left(-\beta - \frac{a}{R}\right)}\right] \geq 4 \text{ mm}$$

where X (mm) represents a distance between the first deflection point and a first reflection point of a principal ray of the on-axis light flux on the optical surface along a first direction perpendicular to the first cross section, α (rad) represents an angle formed by an on-axis light flux entering the optical surface with respect to a main scanning section when viewed in a sub-scanning section, β (rad) represents an angle formed by a surface normal at the first reflection point of the optical surface with respect to the main scanning section when viewed in the sub-scanning section, -R (mm) represents a curvature radius of the optical surface in the sub-scanning section at the first reflection point, and 2a (mm) represents a width of the on-axis light flux on the optical surface in the sub-scanning section.

15. The light scanning apparatus according to claim 14, wherein the following conditions are satisfied:

$$-2X\beta \geq 4 \text{ mm},$$

$$X\left[-\frac{a}{X} + \frac{-\frac{a}{X} + 2\left(-\beta + \frac{a}{R}\right)}{1 + \frac{2a}{X}\left(-\beta + \frac{a}{R}\right)}\right] \geq 4 \text{ mm, and}$$

-continued $$X\left[\frac{a}{X} + \frac{\frac{a}{X} + 2\left(-\beta - \frac{a}{R}\right)}{1 - \frac{2a}{X}\left(-\beta - \frac{a}{R}\right)}\right] \geq 4 \text{ mm.}$$

16. The light scanning apparatus according to claim 1,
wherein a fourth cross section is a section including a second deflection point on the deflector and being perpendicular to the optical axis of the imaging optical element, and a second marginal ray is a ray on a side closer to the second deflection point in the fourth cross section, the second marginal ray being included in a most off-axis light flux reflected by the optical surface after being deflected at the second deflection point, and
wherein the light scanning apparatus is configured to cause the second marginal ray to travel toward a position spaced apart from the second deflection point in the sub-scanning direction by 4 mm or more in the fourth cross section.

17. The light scanning apparatus according to claim 1, wherein a tilt amount of the optical surface at a second reflection point on the optical surface of a principal ray of a most off-axis light flux deflected at a second deflection point on the deflector, in a sub-scanning section is smaller than a tilt amount of the optical surface at a first reflection point on the optical surface of a principal ray of the on-axis light flux in the sub-scanning section.

18. The light scanning apparatus according to claim 1, wherein an absolute value of a power of the optical surface at a second reflection point on the optical surface of a principal ray of a most off-axis light flux deflected at a second deflection point on the deflector, in a sub-scanning section is smaller than an absolute value of a power of the optical surface at a first reflection point on the optical surface of a principal ray of the on-axis light flux in the sub-scanning section.

19. An image forming apparatus comprising:
the light scanning apparatus of claim 1;
a developing unit configured to develop, as a toner image, an electrostatic latent image formed on the scanned surface by the light scanning apparatus;
a transferring unit configured to transfer the developed toner image onto a transferred material; and
a fixing unit configured to fix the transferred toner image to the transferred material.

20. An image forming apparatus comprising:
the light scanning apparatus of claim 1; and
a printer controller configured to convert a signal output from an external apparatus into image data and input the image data to the light scanning apparatus.

* * * * *